US011988105B2

(12) United States Patent
Karnofski et al.

(10) Patent No.: US 11,988,105 B2
(45) Date of Patent: May 21, 2024

(54) ACOUSTICAL HEALTH MONITORING FOR TURBOMACHINERY

(71) Applicant: The Boeing Company, Chicago, IL (US)

(72) Inventors: Kent E. Karnofski, Seattle, WA (US); Ariel F. Irizarry, Seattle, WA (US); R. Eugene Iverson, Seattle, WA (US); Franz D. Betz, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 953 days.

(21) Appl. No.: 16/456,185

(22) Filed: Jun. 28, 2019

(65) Prior Publication Data
US 2020/0408106 A1    Dec. 31, 2020

(51) Int. Cl.
| | | |
|---|---|---|
| *B60W 10/30* | (2006.01) | |
| *B64D 31/00* | (2006.01) | |
| *F01D 23/00* | (2006.01) | |
| *F01D 25/04* | (2006.01) | |
| *B64D 33/02* | (2006.01) | |
| *B64D 45/00* | (2006.01) | |

(52) U.S. Cl.
CPC .............. *F01D 25/04* (2013.01); *B60W 10/30* (2013.01); *B64D 31/00* (2013.01); *F01D 23/00* (2013.01); *B60W 2510/30* (2013.01); *B64D 2033/0213* (2013.01); *B64D 2045/0085* (2013.01)

(58) Field of Classification Search
CPC ........ F01D 25/04; F01D 23/00; B60W 10/30; B60W 2510/30; B64D 31/00; B64D 2033/0213; B64D 2045/0085; F05D 2260/80
See application file for complete search history.

(56) References Cited

U.S. PATENT DOCUMENTS

| | | | | |
|---|---|---|---|---|
| 9,797,328 | B2 * | 10/2017 | Martinez ............. | F02D 41/1404 |
| 9,797,801 | B2 | 10/2017 | Batcheller et al. | |
| 2004/0123652 | A1 * | 7/2004 | Benson ................... | F23N 5/242 73/114.12 |
| 2005/0011278 | A1 * | 1/2005 | Brown .................. | G01N 29/036 73/861.18 |
| 2006/0098534 | A1 * | 5/2006 | Hickling ............... | G01S 3/8006 73/594 |
| 2008/0006088 | A1 * | 1/2008 | Wago ...................... | G01M 3/24 417/63 |
| 2008/0279706 | A1 * | 11/2008 | Gambier ............. | F04B 53/1022 251/360 |
| 2009/0301055 | A1 | 12/2009 | Kallappa | |
| 2012/0330499 | A1 * | 12/2012 | Scheid ................... | G01N 29/14 701/29.6 |
| 2014/0347043 | A1 * | 11/2014 | Chana .................... | G01N 27/90 324/242 |
| 2015/0168229 | A1 * | 6/2015 | DeSilva ................. | G01K 13/02 60/803 |
| 2016/0177856 | A1 * | 6/2016 | Martinez ............. | F02D 41/1404 701/99 |

(Continued)

*Primary Examiner* — Hussein Elchanti
(74) *Attorney, Agent, or Firm* — GATES & COOPER LLP

(57) ABSTRACT

A health monitoring system including an array of microphones, a data collection system, and analytic software used to detect health status, pending malfunctions, or faults of several disparate, engine subsystems. The system can be used to monitor health of the main engines, the engine nacelles, and auxiliary power units (APU) on the aircraft.

22 Claims, 18 Drawing Sheets

(56) References Cited

U.S. PATENT DOCUMENTS

| | | | |
|---|---|---|---|
| 2016/0377500 A1* | 12/2016 | Bizub | F02D 41/22 |
| | | | 73/35.03 |
| 2017/0052150 A1* | 2/2017 | Zalameda | G01N 29/043 |
| 2017/0260871 A1 | 9/2017 | Schmidt et al. | |
| 2018/0340898 A1* | 11/2018 | Arsenault | G01M 5/0091 |

* cited by examiner

ACOUSTICAL HEALTH MONITORING FOR TURBOMACHINERY

BACKGROUND

1. Field

The present disclosure relates to a system for health monitoring of turbomachinery (e.g., in a main engine) and its nacelle, as well as an auxiliary power unit.

2. Description of the Related Art

FIG. 1 illustrates an exemplary aircraft engine comprising a fan 100 having fan blades 100a, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. Also illustrated are the rotor shaft's 122 longitudinal axis 128, transmission 130 connecting a gearbox 132 to the rotor shaft 122, and air inputted into the engine during operation. Many of these components can suffer latent or apparent failure that reduces operational efficiency of the engine or causes schedule interruptions for repairs. Thus, it is generally desirable to monitor health of engine components so as to identify failures before they cause more significant delays or reductions in performance.

Conventional methods use an accelerometer in a system tailored to monitor health of a specific engine component. The present disclosure, on the other hand, discloses a system capable of monitoring the health of multiple distinct engine components under a variety of operating conditions.

SUMMARY

A health monitoring system according to embodiments described herein can be embodied in many ways including, but not limited to, the following.

1. A system, comprising:
one or more acoustic sensors outputting signals in response to acoustic waves transmitted from a plurality of distinct engine subsystems of an engine; when the distinct engine subsystems are acoustically coupled to the acoustic sensors; and wherein the signals comprise information used to determine a health status of each of the distinct engine subsystems. 2. The system of clause 1, further comprising an output connected to the acoustic sensors, wherein the output outputs the health status of each of the distinct engine subsystems determined using the signals.

3. The system of clause 2, wherein the output comprises an indicator connected to an electronic circuit.

4. The system of clause 1, further comprising a computer connected to the acoustic sensors, wherein the computer monitors the health status. In one or more examples, the computer analyzes the signals using signal processing and/or a machine learning algorithm, so as to obtain an analyzed signal used to monitor the health status.

5. The system of clause 4, wherein the engine includes a combustor; fan blades, compressor blades, and turbine blades, and the computer monitors the health status using the signals in combination with data received from the engine, the data including at least one parameter selected from a temperature of the engine, a speed of the fan blades, a speed of the compressor blades, and/or a speed of the turbine blades, and a fuel flow to a combustor in the engine.

6. The system of clauses 4 or 5, wherein:
the computer monitors at least one characteristic of the acoustic waves selected from one or more frequencies of the acoustic waves and one or more amplitudes of the acoustic waves, and
changes in the at least one characteristic are used to determine the health status.

7. The system of clause 6, wherein the computer performs a Fourier analysis of signal so as to determine the one or more frequencies.

8. The system of any of the clauses 4-7, wherein:
the distinct engine subsystems include components,
the computer determines a source of the acoustic waves using a triangulation method, and
the computer monitors the health status of at least one of the components located at the source (e.g., so as to isolate faults at the source).

9. The system of any of the clauses 1-8, wherein the distinct engine subsystems include at least one component selected from a starter motor clutch, a latch on a door of an engine housing; an air cooler for cooling engine bleed air; a duct conveying the engine bleed air; a compressor, an ignition exciter, an aeroseal (e.g., in the nacelle), other gaps or holes in the nacelle; a combustor chamber; and a gearbox.

10. The system of any of the clauses 1-9, wherein the one or more sensors are distributed on the podded engine so as to receive the acoustic waves from the distinct engine subsystems in different zones of the engine.

11. The system of any of the clauses 4-10, wherein the computer analyzes the signals using a computer-implemented machine learning model, wherein the computer implemented machine learning model determines the health status of the engine.

12. The system of clause 11, wherein the computer implemented machine learning model comprises a decision tree, a neural network, or a gaussian mixture model.

13. The system of clause 11 or clause 12, wherein computer implemented machine learning model is trained with the signals obtained during different operating conditions (e.g., fan speed) of the engine and/or during different environmental conditions (e.g., ambient temperature) of the engine, so that the machine learning model determines the health status for different operating conditions.

14. The system of clauses 11, 12, or 13, wherein the computer implemented machine learning model determines the health status of the engine as a function of time, different operating conditions of the engine, and/or different environmental conditions of the aircraft.

15. The system of clauses 13 or 14, wherein the different operating conditions include different engine speeds and different temperatures of the engine.

16. The system of any of the clauses 1-15, wherein the engine comprises turbomachinery on an aircraft.

17. The system of any of the clauses 1-16, wherein the turbomachinery comprises a gas turbine engine propelling the aircraft or an auxiliary power unit on the aircraft.

18. A system, comprising:
one or more acoustic sensors outputting signals in response to acoustic waves transmitted from one or more engine components and detected on the one or more acoustic sensors;
a computer connected to the acoustic sensors, wherein the computer analyzes the signals 400 using a computer-implemented machine learning model, and the computer implemented machine learning model determines the health status of the engine.

19. A computer-implemented method, comprising:
monitoring health of an engine or engine housing, including:
receiving signals in response to acoustic waves transmitted from an engine or an engine subsystem;
providing a computer-implemented machine learning model;
analyzing the signals using the computer-implemented machine learning models so as to determine a health status of the engine or the engine subsystem.

20. The method of clause 19, further comprising:
training the computer-implemented machine learning model using the signals, including:
obtaining the signals comprising training signals during different operating conditions of the engine or the engine subsystem;
obtaining at least one property of the training signals as a function of the different operating conditions, the at least one property selected from one or more frequencies of the acoustic waves and one or more amplitudes of the acoustic waves, the one or more frequencies including one or more first frequencies and one or more second frequencies, and the one or more amplitudes including one or more first amplitudes and one or more second amplitudes;
determining a plurality of health statuses of the engine or the engine subsystem as a function of the different operating conditions, the health statuses including:
a first health status associated with the engine comprising a healthy engine or a healthy engine subsystem, and
a second health status associated with the engine comprising an unhealthy engine or an unhealthy engine subsystem,
associating the one or more or first frequencies, the one or more first amplitudes, or the one or more first frequencies and the one or more first amplitudes, with the first health status; and
associating the one or more second frequencies, the one or more second amplitudes, or the one or more second frequencies and the one or more second amplitudes, with the second health status; so as to obtain the computer-implemented machine learning model comprising a trained computer-implemented machine learning model; and
analyzing the signals different from the training signals using the trained computer-implemented machine learning model so as to determine the health status of the engine or the engine subsystem transmitting the signals different from the training signals.

21. The method of clause 20, wherein the analyzing comprises comparing the training signals 400*a* and the signals 400 different from the training signals.

22. The method of clauses 19, 20, or 21 wherein the engine or the engine subsystem comprises a component, the method further comprising:
performing a Fourier analysis of signals so as to determine the one or more frequencies; and
determining a source of the acoustic waves using triangulation, wherein the computer-implemented machine learning model monitors the health status of the component located at the source.

23. The method of any of the clauses 19-22, wherein the acoustic waves are transmitted from at least one component of the engine or engine subsystem selected from a starter motor clutch, an aeroseal, a duct for transporting engine bleed air; an air cooler; a latch on a door of an engine housing; an engine compressor, an ignition exciter, a gearbox.

A system as described herein can be used to monitor health of the main engines, the engine nacelles, and the auxiliary power units (APU) on the aircraft

BRIEF DESCRIPTION OF THE DRAWINGS

FIGS. 12A and 12B illustrate exemplary acoustic signatures obtained for leaky ducts transporting engine bleed air, wherein FIG. 12B illustrates how the frequency of the acoustic waves changes for different sized holes in the duct illustrated in FIG. 12C.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
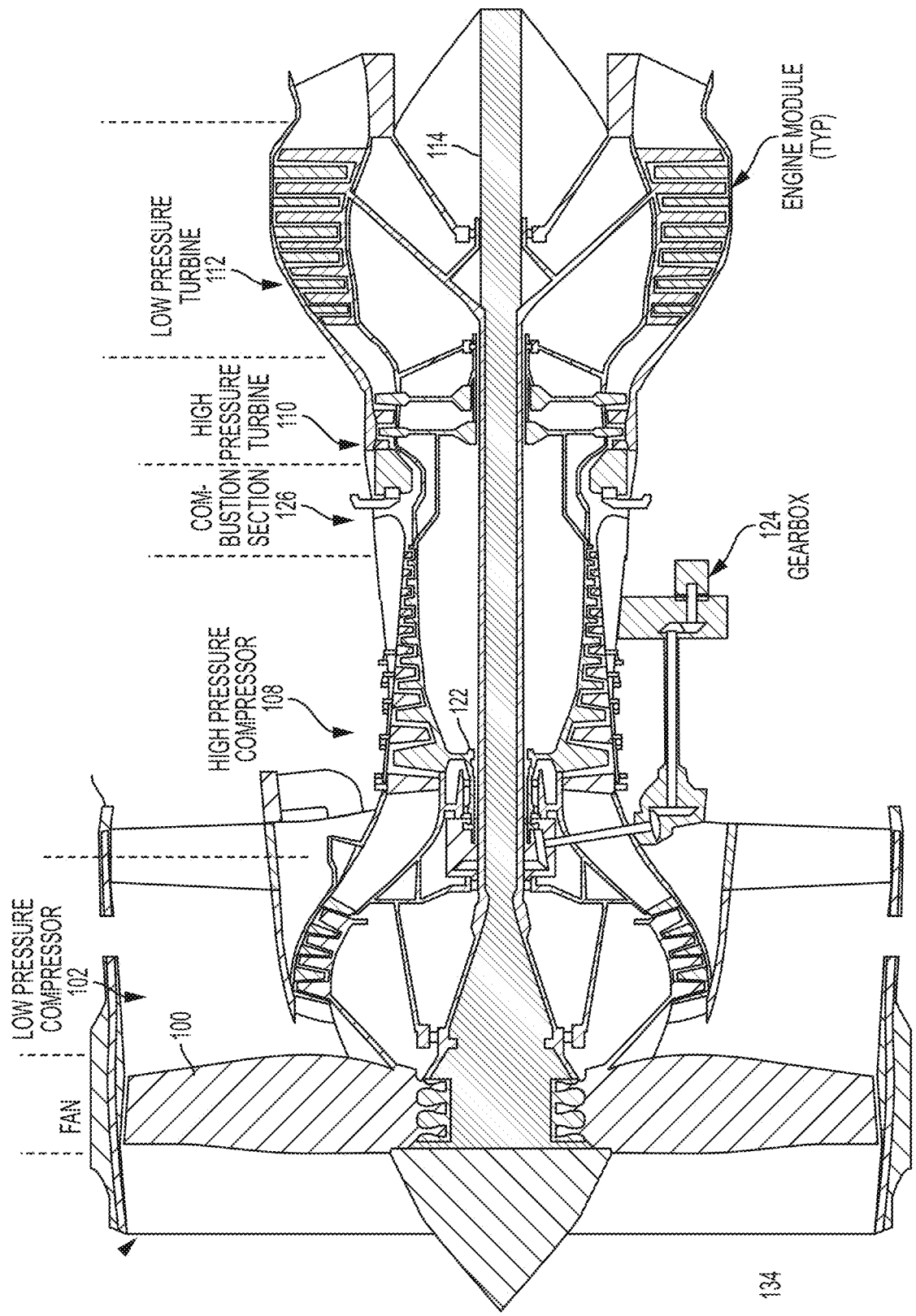
FIG. 1 illustrates an aircraft engine.
Figure 2A:
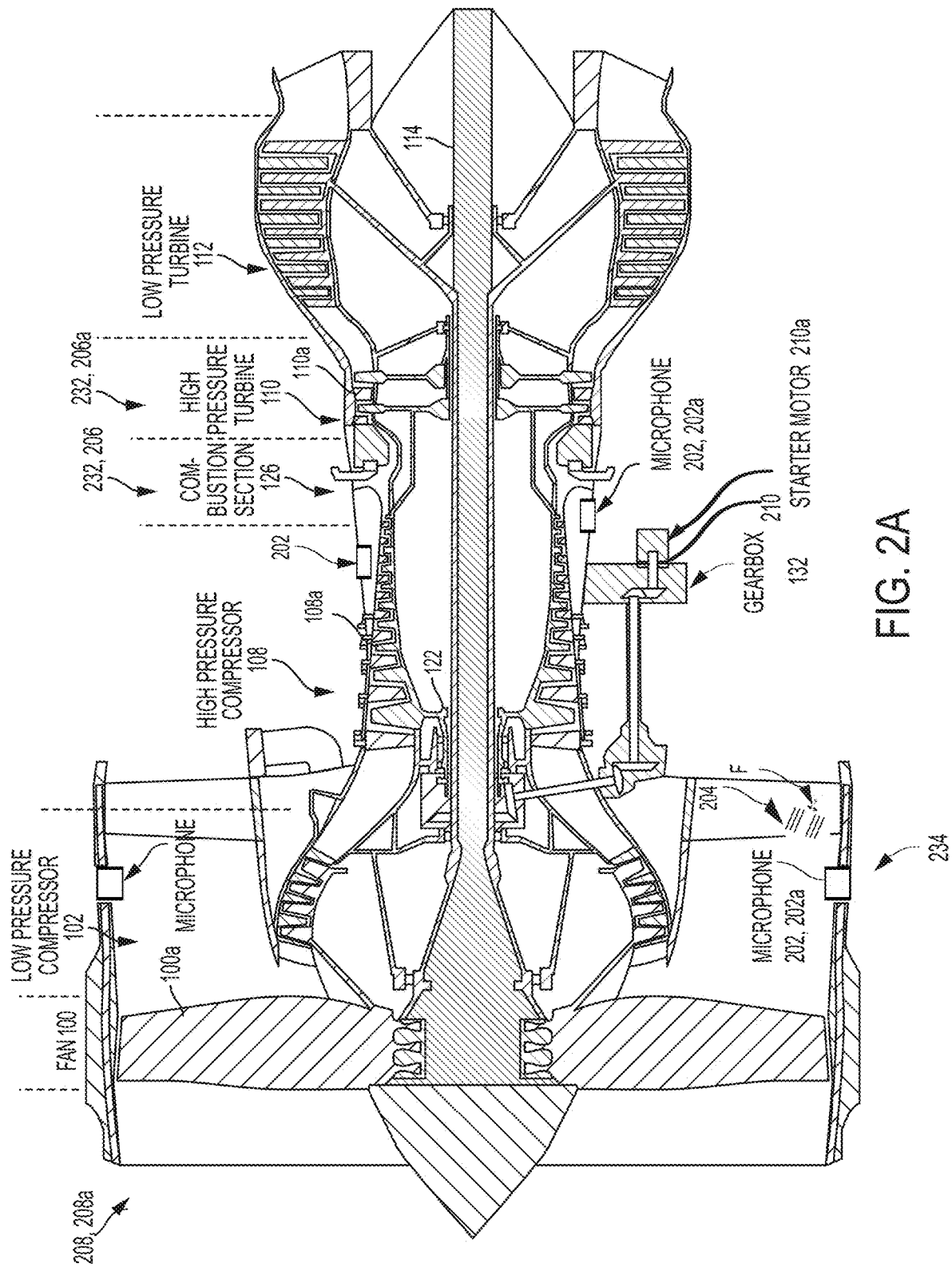
FIGS. 2A-2D illustrate exemplary positioning of acoustic sensors (microphones) around the aircraft engine.
Figure 2B:
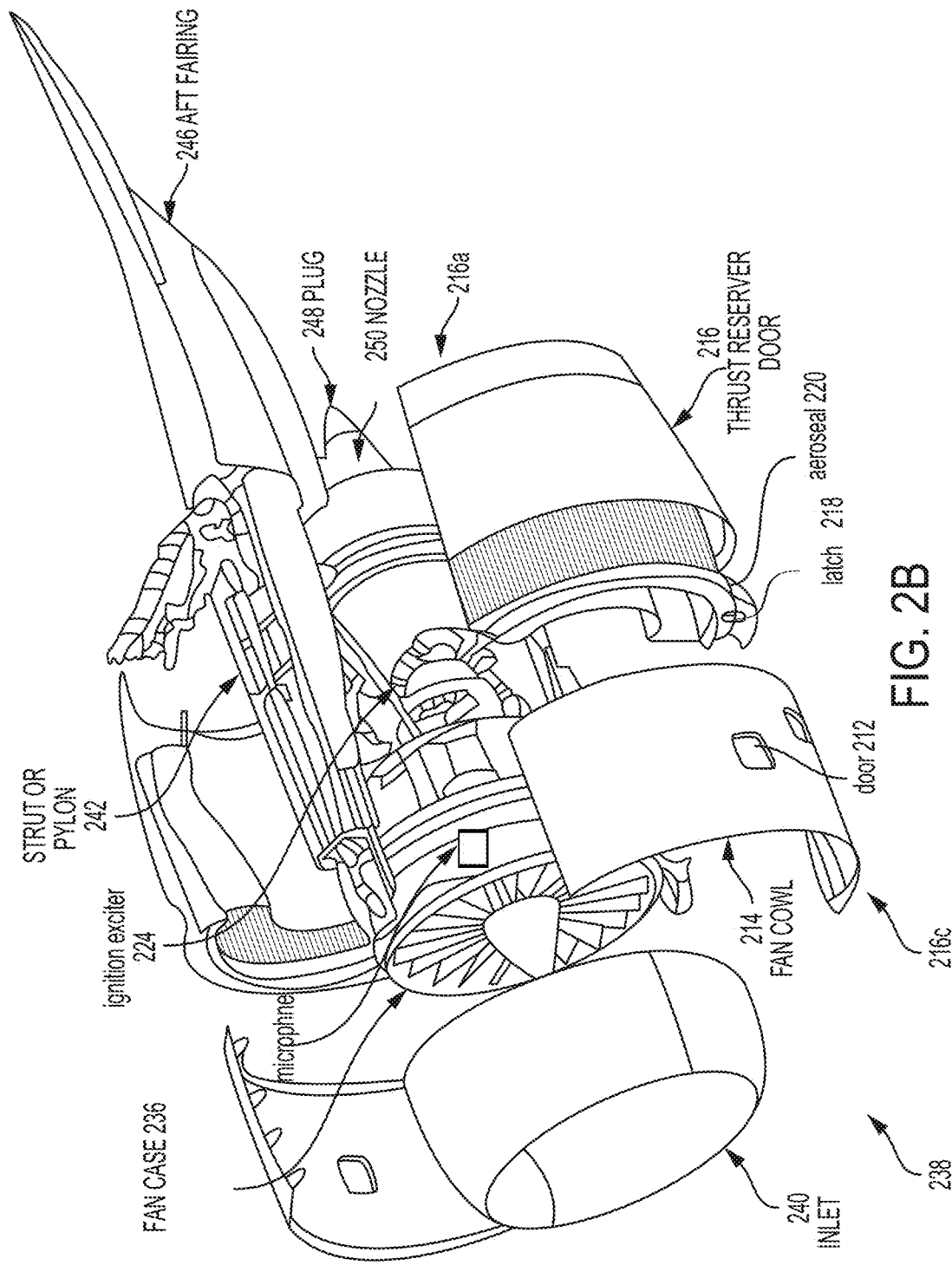
Figure 2C:
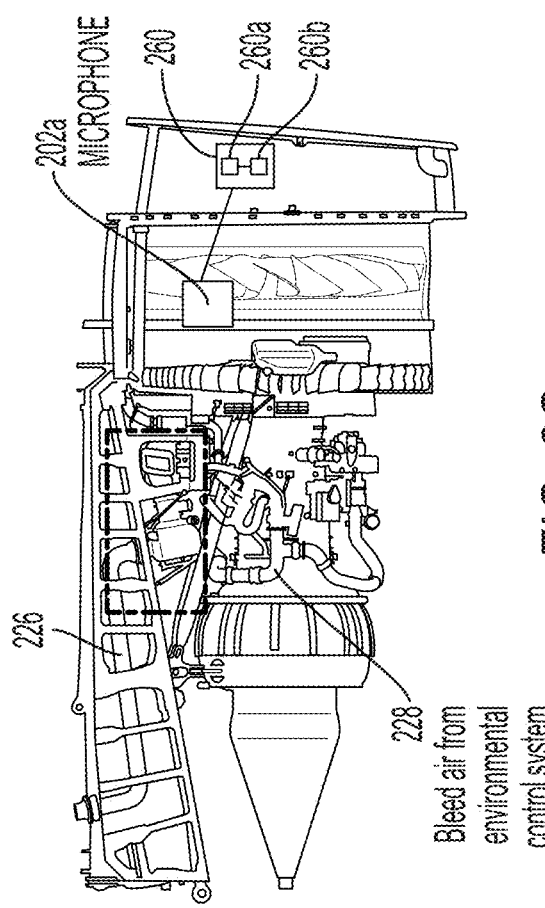
Figure 2D:
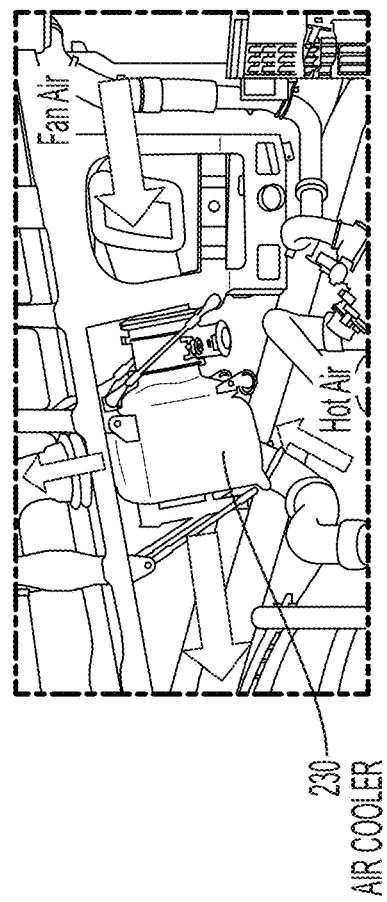

FIG. 2A, FIG. 2B, and FIG. 2C illustrate a system 200 comprising one or more acoustic sensors 202 (e.g., microphones) outputting one or more signals (e.g., electrical signals) in response to one or more acoustic waves 204 transmitted from a plurality of distinct engine subsystems 206 of an engine 208. The distinct engine subsystems 206 include, but are not limited to, at least one component 206a selected from a starter motor clutch 210 for a starter motor 210a, a door 212, 216 or cowl of an engine housing 216c (e.g., fan cowl 214, thrust reverser 216a), a latch 218 on a door of an engine housing 216c; a compressor 108, an aeroseal 220, an ignition exciter 224, an air duct 226 transporting engine bleed air 228 for an environmental control system, an air cooler 230 for the engine bleed air, an electrical generator, a hydraulic pump, and a gearbox 132. The one or more sensors 202 are zonally distributed on the podded engine 208 so as to receive the acoustic waves from the distinct engine subsystems in different zones 232 of the engine. As illustrated in FIGS. 2A, 2B, and 2C, the acoustic sensors 202 can comprise an array 234 of acoustic sensors 202 distributed around the engine or nacelle 238, e.g., on or acoustically coupled to a fan case 236, on or acoustically coupled to an inlet 240, on or acoustically coupled to a housing of the engine core near the compressor, or on or acoustically coupled to a strut or pylon 242, an aft fairing 246, a plug 248, or a nozzle 250. FIG. 2D is a close up view of the boxed area in FIG. 2C, showing flow of fan air through the air cooler 230. FIG. 2C further illustrates an output 260 connected to the acoustic sensors, wherein the output 260 outputs the health status of each of the distinct engine subsystems determined using the signals. In one embodiment, the output 260 comprises an indicator 260a connected to an electronic circuit 260b.

In one or more further embodiments, the output 260 is connected to or comprises a data collection system (e.g. a computer) analyzing the signals to identify the health status of the various engine subsystems. In one or more examples, the computer analyses changes in the properties (e.g., frequency F, amplitude, and/or dispersion) of the acoustic waves to identify changes in the health status of the engine subsystem. Thus, a single array of microphones can detect multiple failures of different engine subsystems e.g., nacelle aero seal leaks, starter motor clutch failing to engage/disengage, fan cowl latch failure, unlocked fan cowl latch, electrical generator bearing deterioration, hydraulic pump bearing degradation; an open boroscope plug, and a faulty ignition exciter (e.g., as identified by a failure of the ignition exciter to output a clicking sound upon ignition).

In one or more embodiments, the acoustic sensors 202 detect the acoustic waves propagating through free space between the engine subsystems and the sensors (e.g., as opposed to vibrations propagating through structural elements). In one or more examples, the acoustic sensors 202 are capable of detecting acoustic waves having a frequency corresponding to audible and ultrasound frequencies (e.g., in a range of 6 Hz to 20,000 Hz or higher).

In one or more examples, the data collection system is connected to/integrated with conventional health monitoring systems/sensors and engine components (e.g., fuel metering valves), including sensors measuring parameters including the fan speed (N1) (e.g., speed N1 of the fan blades), core speed (N2) (e.g., a speed N2 of the compressor blades 108a, and/or a speed N1 of the turbine blades 110a, exhaust gas temperature, compressor outlet pressure, fuel flow (e.g., to a combustion section 126 or combustor), oil pressure, oil temperature, and oil quantity, rotor vibrations, aircraft altitude, aircraft speed, and total air temperature. In one or more examples, the health status of the engine subsystems is determines using one or more of the parameters in combination with the signals form the acoustic sensors.

Example Source localization: Triangulation

Figure 3:
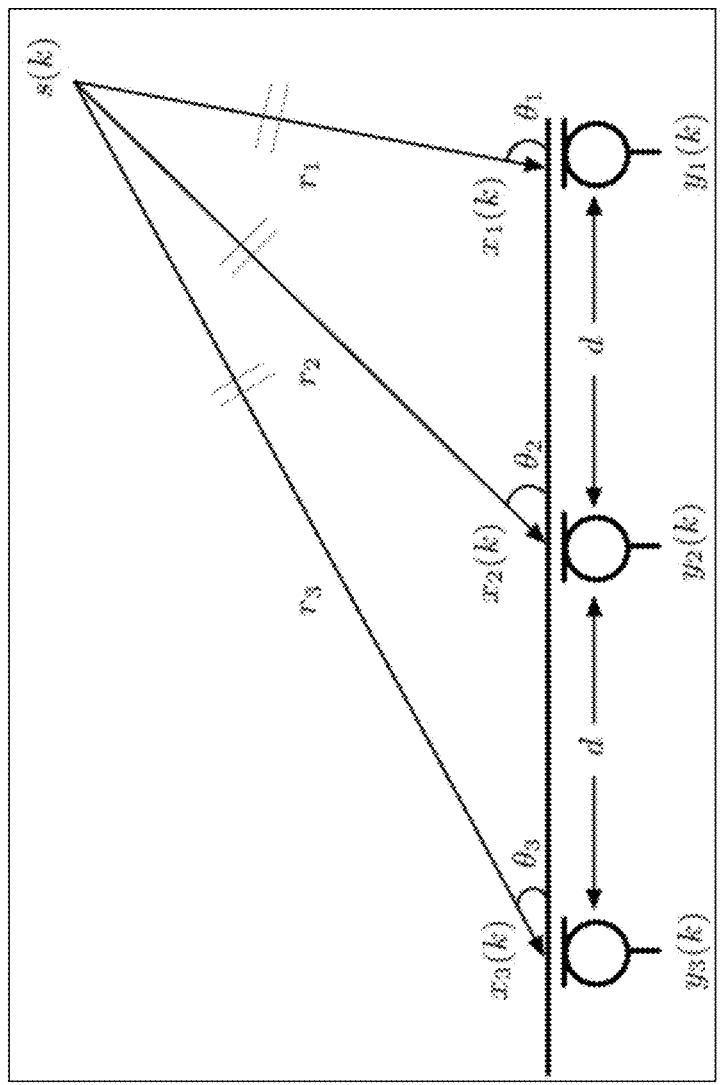
FIG. 3 illustrates how signal processing of the acoustic waves received by the array of microphones can be used to identify the location of the source of the acoustic waves (e.g., using triangulation), according to one or more examples.

FIG. 3 illustrates how a source s(k) of the acoustic waves 204 can be determined using a sound source localization method such as a triangulation method. Example localization methods use time $\tau_{12}$ $\tau_{13}$ and distance $r_1, r_2, r_3$ of arrival to identify the location of the source. In one or more examples, the localization method comprises solving the system:

$$\left.\begin{array}{l} \tau_{12} = \dfrac{r_2 - r_1}{c}, \tau_{13} = \dfrac{r_3 - r_1}{c} \\ r_2^2 = r_1^2 + d^2 + 2r_1 d\, \cos(\theta_1) \\ r_3^2 = r_1^2 + 4d^2 + 4r_1 d\, \cos(\theta_1) \end{array}\right\} \text{Solve system}$$

and applying a sine law to obtain $\theta_2$ and $\theta_3$.

Figure 4:
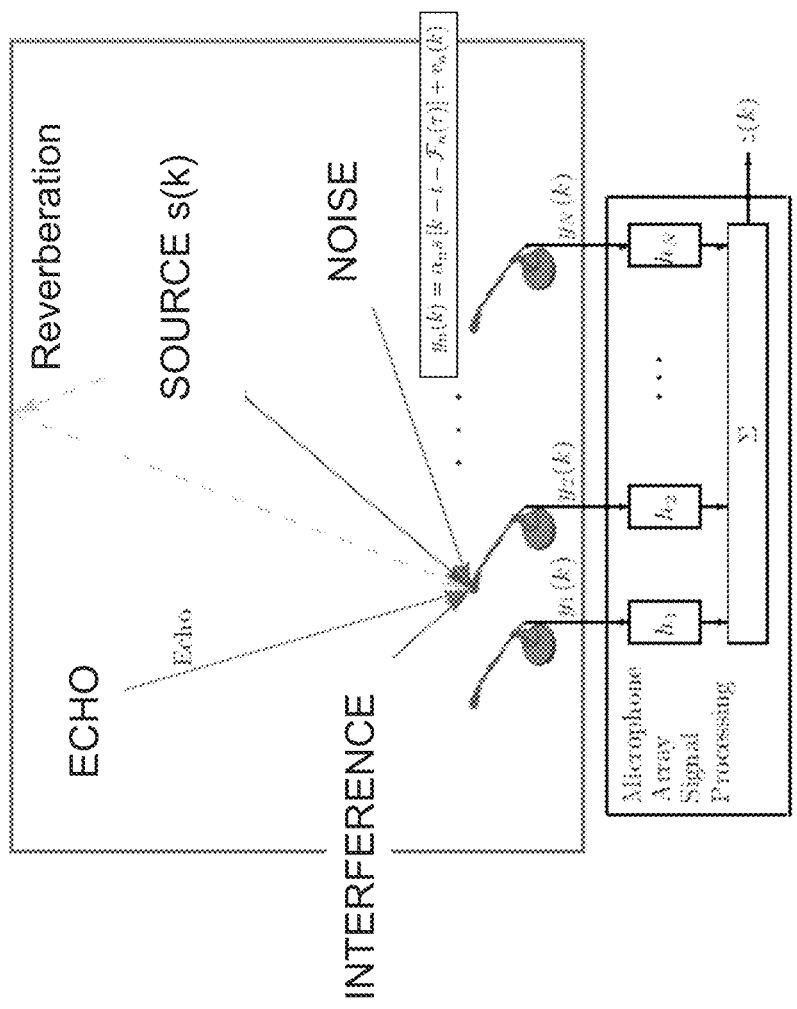
FIG. 4 illustrates how signal processing of the acoustic waves received by the array of microphones can be used to extract the source from undesired noise, interference, and echoing.

Acoustic waves 204 comprising sound typically comprise a continuous frequency rich signal (not an impulse) so estimating lag between two different recordings can be difficult. Obstacles include noise, reverberation, source relative movement and spatial aliasing, as illustrated in FIG. 4. FIG. 4 illustrates appropriate positioning of the acoustic sensors 202 (e.g., microphones 202a) in an array 234 and using signal processing 404 of the signals 400, $y_n(k)$ outputted from the N acoustic sensors 202 (in response to can adequately overcome the problems of localizing the source in the presence of reverberation, echoing, and noise, so as to adequately identify the source of the noise associated with the failure. In one or more examples (referring to FIG. 4), the received signals for N sensors indexed n=1, 2 . . . N at time k are given by $y_n(k)=\alpha_n s[k-t-F_n(T)]+v_n(k)$, where $\alpha_n$, n=1, 2, . . . , N are attenuation factors due to propagation effects, s(k) is the unknown source signal, t is the propagation time from the unknown source to sensor microphone 1, $v_n(k)$ is an additive noise signal at the $n^{th}$ microphone, $\tau$ is the relative delay between microphones 1 and 2, and $F_n(\tau)$ is the relative delay between microphones 1 and n with $F_1(\tau)=0$ and $F_2(\tau)=\tau$.

Machine Learning

Figure 5:
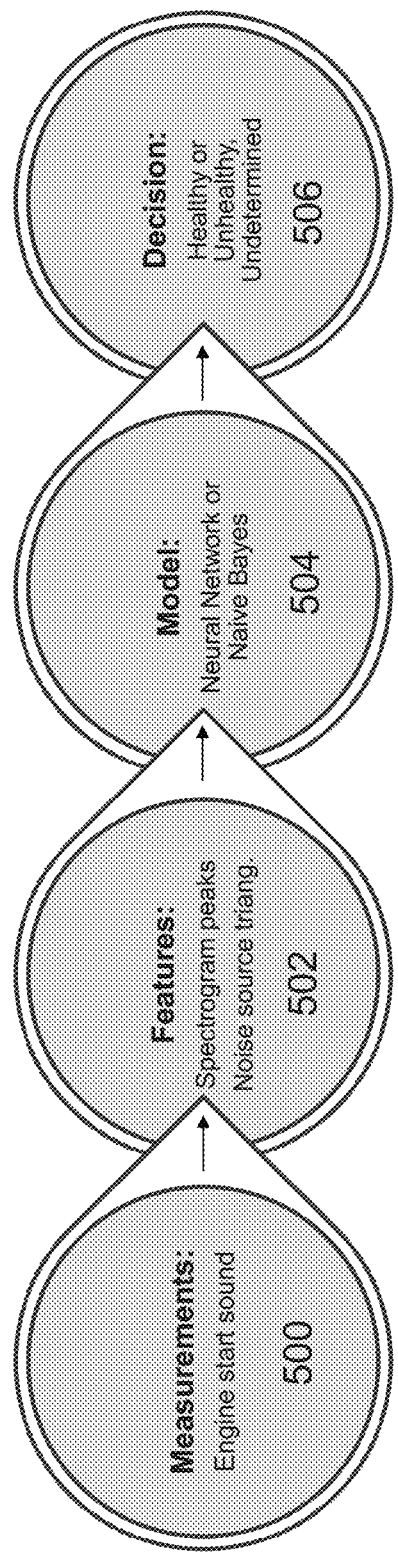
FIG. 5 illustrates a method of determining a health status using a machine learning model, according to one or more examples.

FIG. 5 is a flowchart illustrating analyzing the signals from the acoustic sensor using a computer-implemented machine learning model, wherein the computer implemented machine learning model determines the health status of the engine or engine subsystem. In one or more examples, a computer-implemented machine learning model comprises a machine learning method or algorithm implemented on a computer using software or a computer program.

The method comprises receiving signals in response to acoustic waves transmitted from the engine or the engine housing (measurements 500); identifying characteristics of the acoustic waves (features 502); providing a computer-implemented machine learning algorithm (model 504); and analyzing the characteristics of the signals using the computer-implemented machine learning model so as to determine a health status of the engine or the engine subsystem (decision 506).

Figure 6:
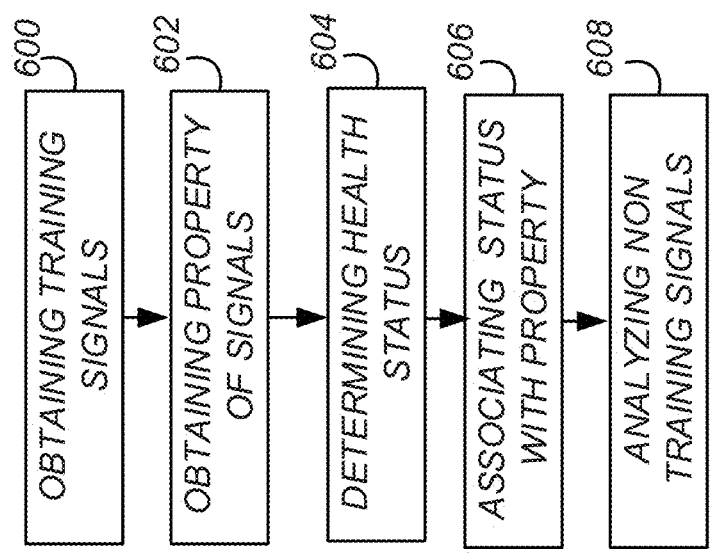
FIG. 6 is a flowchart illustrating a method for training a machine learning model, according to one or more examples.

FIG. 6 is a flowchart illustrating a method of training the computer-implemented machine learning model using the signals.

Block 600 represents obtaining the signals comprising training signals during one or more different operating conditions of the engine or the engine subsystem. Examples of different operating conditions include different fan speed (N1) (e.g., speed N1 of the fan blades), core speed (N2) (e.g., a speed N2 of the compressor blades 108*a*, and/or a speed N1 of the turbine blades 110*a*, exhaust gas temperature, compressor outlet pressure, fuel flow (e.g., to a combustion section 126 or combustor), oil pressure, oil temperature, and oil quantity, rotor vibrations, aircraft altitude, aircraft speed, and total air temperature.

Block 602 represents obtaining at least one property of the training signals as a function of the different operating conditions, the at least one property selected from one or more frequencies of the acoustic waves and one or more amplitudes of the acoustic waves. The one or more frequencies include one or more first frequencies and one or more second frequencies, and the one or more amplitudes include one or more first amplitudes and one or more second amplitudes.

Block 604 represents determining a plurality of health statuses of the engine or the engine subsystem as a function of the different operating conditions. The health statuses include a first health status associated with the engine comprising a healthy engine or the engine subsystem comprising a healthy engine subsystem, and a second health status associated with the engine comprising an unhealthy engine or the engine subsystem comprising an unhealthy engine subsystem.

Block 606 represents associating the one or more or first frequencies, the one or more first amplitudes, or the one or more first frequencies and the one or more first amplitudes, with the first health status; and associating the one or more second frequencies, the one or more second amplitudes, or the one or more second frequencies and the one or more second amplitudes, with the second health status; so as to obtain the computer-implemented machine learning model comprising a trained computer-implemented machine learning model.

Block 608 represents analyzing non-training signals 400*b* different from the training signals using the trained computer-implemented machine learning model, so as to determine the health status of the engine or the engine subsystems transmitting the non-training signals different from the training signals. In one or more examples, the machine learning model compares the frequencies and amplitudes of the non-training signals with the one or more first frequencies, the one or more second frequencies, the one or more first amplitudes, and one or more second amplitudes. For example, if the frequencies and/or amplitudes of the non-training signals are within a range encompassed by the first frequencies and/or first amplitudes, respectively, the trained machine learning model associates the non-training signals with a healthy engine subsystem. If the frequencies and/or amplitudes of the non-training signals are within a range encompassed by the second frequencies and/or second amplitudes, respectively, the machine learning model associates the non-training signals with an un-healthy engine subsystem.

Example Learning Models

Example learning models include, but are not limited to:
Decision trees using a list of thresholds and/or logic. The decision algorithm proceeds along a tree of conditions to make a decision. In one example, the model compares the measured parameter (characteristic of the acoustic wave) with a threshold value so as to determine whether the characteristic is above or below a threshold value.
Support Vector Machines.
Networks, e.g., neural networks including deep learning and Bayesian networks.
Gaussian Mixture Models (GMM).

In one or more further examples, an "ensemble" of conditions are created to obtain an ensemble average using ensemble theory. Ensemble techniques can increase the computing speed and accuracy. For example, a plurality of machine learning algorithms can be used to improve the acoustic detection capability and accuracy of the health monitoring, as compared to using any one of the constituent learning algorithms alone.

Algorithms can be used generically so that the data makes the application unique. One method to modify in a non-standard way uses a Gaussian Mixture Model (GMM) to identify operating states of the system being monitored. Changes or abnormal acoustics within a state can be a powerful tool to detect changes in acoustic states. In one or more examples, the operating states include a series of hidden states of the system.

Example Machine Learning Process

Figure 7:
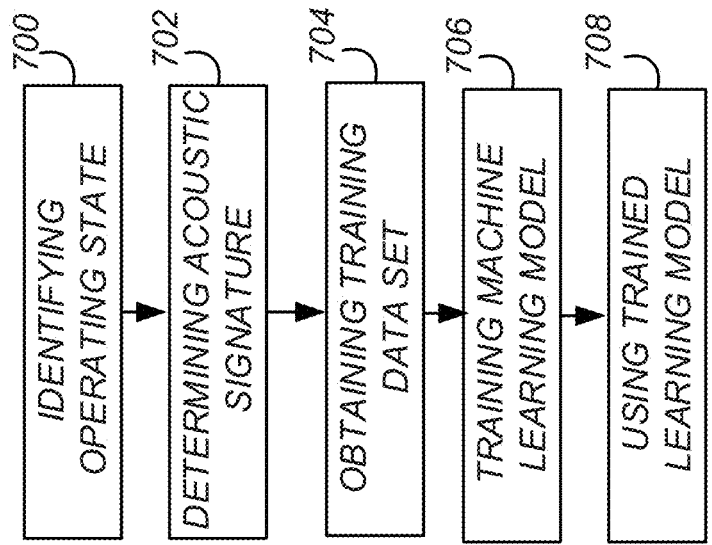
FIG. 7 illustrates a flowchart illustrating a method of training a machine learning model on a plurality of operating states.

FIG. 7 illustrates a flowchart illustrating a method of training a machine learning model on a series of operating states of a system.

Block 700 represents identifying an operating state of a vehicle engine comprising engine components.

Block 702 represents determining the acoustic or sound signature of the vehicle engine in the operating state during healthy operation.

Block 704 represents repeating steps 700-702 as necessary for the next operating state so as to obtain a data set comprising the acoustic signature for the engine components as a function of operating state and operating state parameters (e.g., fuel flow to engine, engine speed, engine temperature, ambient environmental conditions, altitude, airspeed). In one example, the series of operating states include one or more of the following: starting the engine, engaging a transmission; and disengaging the transmission. The data set includes information on how the engine should sound (e.g., a value or range of values for one or more characteristics of the acoustic waves) in each of the operating states during healthy operation. For example, the data set may include the a value or range of healthy values for one or more characteristics of the acoustic waves when the engine speed is at least 50% of the maximum speed, the valve providing fuel to the engine is open, and the temperature T of the engine is in a range of 20° C.≤T 100° C. In one or more further examples, the machine learning model is trained to identify abnormal and normal sounds or acoustic signatures (properties) during the various operating states.

Block 706 represents training a machine learning model using the data set, so as to obtain a trained learning model. In one or more embodiments, the machine learning model is trained to recognize patterns in the data set that are associated with a healthy or unhealthy status. As used herein, a healthy status represents proper functioning or operation of the engine subsystem, e.g., per engine design data. In one or more examples, an healthy status represents a status wherein the engine subsystem requires maintenance or is not functioning adequately.

Block 708 represents using the trained learning model to determine the health of a vehicle engine using new data (non-training data) from the system running through a series of operating states. In one example, the series of operating states include one or more of the following: starting the engine, engaging a transmission and disengaging the transmission. In one or more examples, the trained learning model compares the new data comprising signals obtained from the acoustic sensors 202 in each of the series of operating states with the data set comprising abnormal and/or normal acoustic signatures (properties) obtained in Block 704.

Processing Environment

Figure 8:
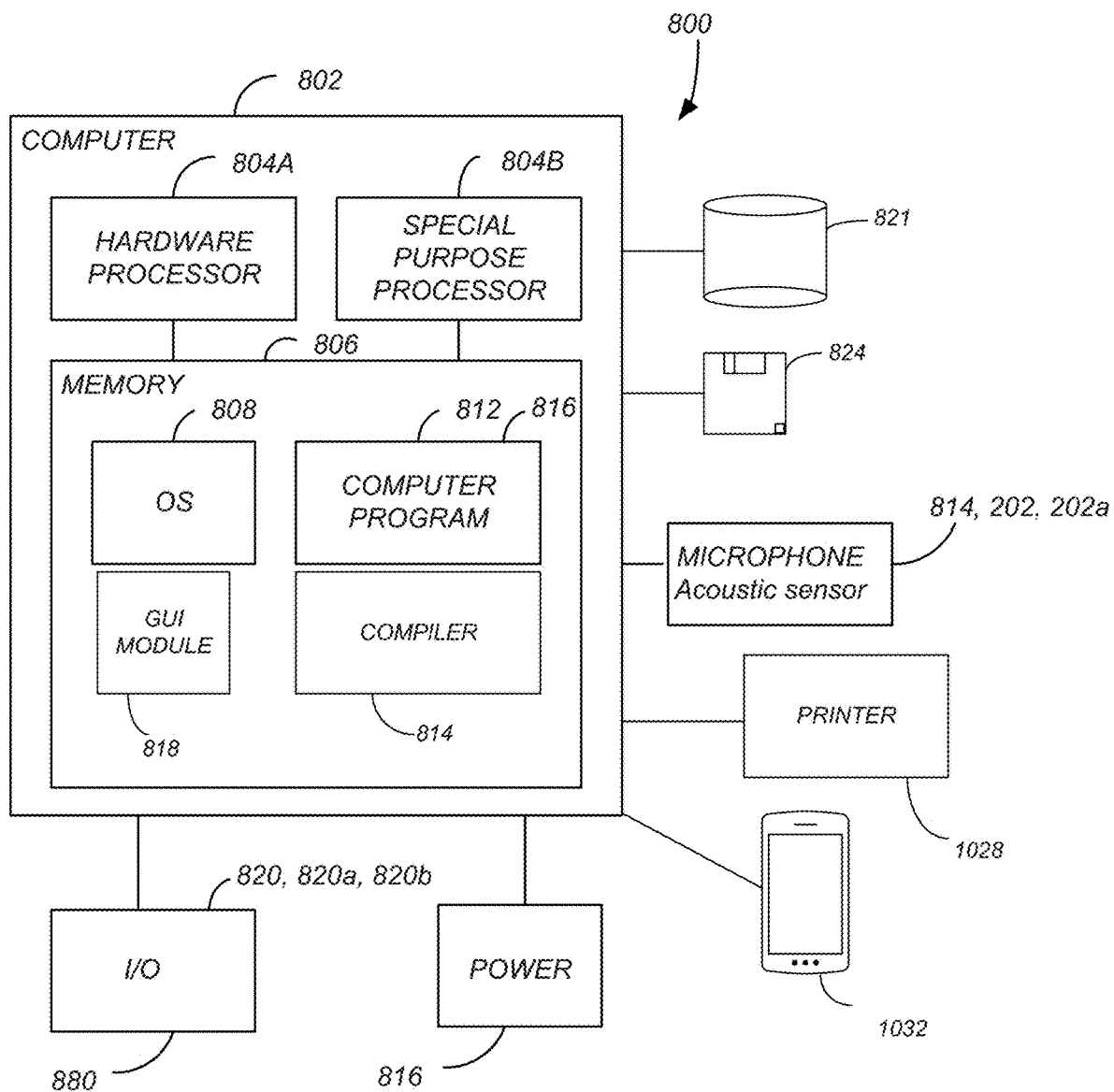
FIG. 8 is an exemplary hardware and software environment.

FIG. 8 illustrates an exemplary system 800 comprising a computer 802 used to implement processing elements needed to determine the health status of the engine or engine subsystems described herein (e.g. using signal processing 404 or machine learning). Computer 802 may be a user/client computer, server computer, or may be a database computer and may include peripherals. The computer 802 comprises a hardware processor 804A and/or a special purpose (hardware) processor 804B (hereinafter alternatively collectively referred to as processor) and a memory 806, such as random access memory (RAM). Generally, the computer 802 operates under control of an operating system 808 stored in the memory 806, and interfaces with the user/other computers to accept inputs and commands (e.g., analog or digital signals) and to present results (e.g., the health status 820) through an input/output (I/O) module 880 or devices. In one or more examples, I/O module comprises a display, graphics user interface (GUI), a keyboard, a printer 828 and/or a pointing/cursor control device (e.g., mouse). Output/results may be presented on the display or provided to another device for presentation or further processing or action. An image may be provided through a GUI module 818, for example. Although the GUI module 818 is depicted as a separate module, the instructions performing the GUI functions can be resident or distributed in the operating system 808, the computer program 810, or implemented with special purpose memory and processors.

In one or more embodiments, computer 802 may be coupled to, or may comprise, a portable device 832 (e.g., cellular/mobile device, smartphone, or laptop, multi-touch, tablet device, or other internet enabled device) executing on various platforms and operating systems.

In one embodiment, the computer 802 operates by the hardware processor 804A performing instructions defined by the computer program 812 (e.g., a machine learning model or method) under control of the operating system 808. The computer program application 812 accesses and manipulates data stored in the memory 806 of the computer 802. The computer program 812 and/or the operating system 808 may be stored in the memory 806 and may interface with the user and/or other devices to accept input and commands and, based on such input and commands and the instructions defined by the computer program 812 and operating system 808, to provide output and results.

Some or all of the operations performed by the computer 802 according to the computer program 812 instructions may be implemented in a special purpose processor 804B. In this embodiment, some or all of the computer program 812 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 812 instructions. In one embodiment, the special purpose processor 804B is an application specific integrated circuit (ASIC).

The computer 802 may also implement a compiler 814 that allows an application or computer program 812 written in a programming language such as C, C++, Assembly, SQL, PYTHON, PROLOG, MATLAB, RUBY, RAILS, HASKELL, or other language to be translated into processor 804 readable code. Alternatively, the compiler 814 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 812 accesses and manipulates data accepted from I/O devices and stored in the memory 806 of the computer 802 using the relationships and logic that were generated using the compiler 814.

The computer 802 also optionally comprises an external communication device such as a modem, satellite link, Ethernet card, or other device for accepting input from, and providing output to, other computers 802.

In one embodiment, instructions implementing the operating system 808, the computer program 812, and the compiler 814 are tangibly embodied in a non-transitory computer-readable medium, e.g., data storage device 821, which could include one or more fixed or removable data storage devices, such as a zip drive, floppy disc drive, hard drive, CD-ROM drive, tape drive, etc. Further, the operating system 808 and the computer program 812 are comprised of computer program 812 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 812 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media In one or more examples, a computer program product comprises a computer readable storage medium 824 having program instructions embodied therewith, the program instructions executable by one or more computers 802 to cause the computers to perform a method comprising monitoring a health status 820 of each of the distinct engine subsystems using the signals received from the acoustic sensors. In one or more embodiments, the one or more computers analyze the signals using a computer-implemented machine learning model 816 or signal processing implemented using computer program 812, so that the computer-implemented learning model 816 (or the signal processing) is used determine the health status of the engine.

Those skilled in the art will recognize many modifications may be made to this configuration without departing from the scope of the present disclosure. For example, those skilled in the art will recognize that any combination of the above components, or any number of different components, peripherals, and other devices, may be used.

Processing Locales

Figure 9:
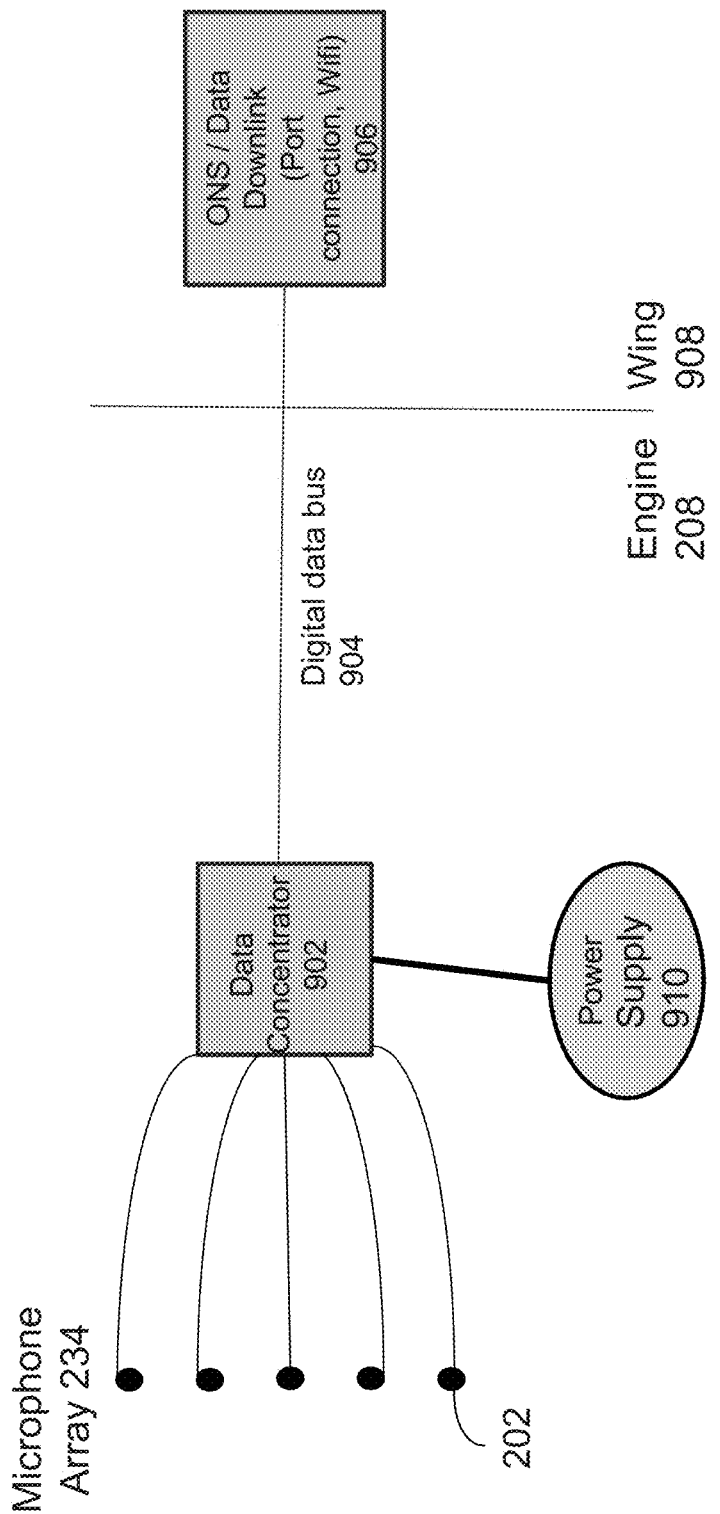
FIG. 9 illustrates localization of the data collection system and microphone array on an aircraft, according to one or more examples.

FIG. 9 illustrates an example wherein all data processing of the acoustic waves enabling monitoring and identification of the health status of the various engine subsystems is provided in a computer on-board the aircraft e.g., using a central maintenance computer function (CMCF) or aircraft condition monitoring function (ACMF), or other common aircraft resource. The system of FIG. 9 includes an array 234 of microphones 202a, a data concentrator 902; a digital data bus 904 connecting the CNS/data downlink 906 (e.g., port connection or WIFI); and the engine 208 (or acoustic sensors 202 coupled to the engine 208) on an aircraft wing 908; and power supply 910.

Figure 10:
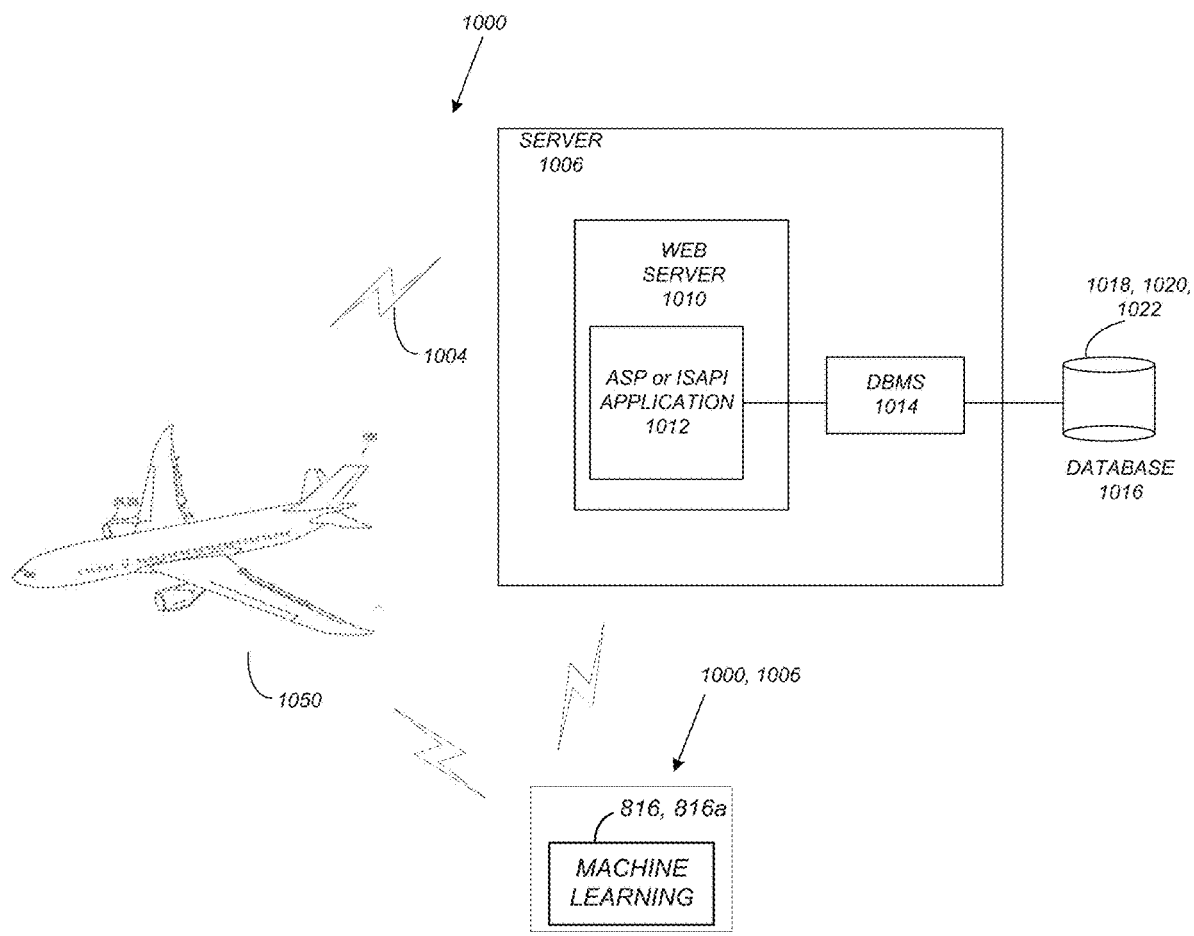
FIG. 10 illustrates transmission of the data measured using the microphone array to a data processing center off the aircraft.

FIG. 10 illustrates an example wherein data acquisition (sensing of the acoustic waves) and optionally some processing is provided on board the aircraft 1050 but a transmitter or data link (e.g., Wi-Fi, SATCOM) for data offload is provided on the aircraft to transmit data off the aircraft for processing off the aircraft, e.g., to a central data center for big data processing. Data offloaded from individual aircraft can be transmitted to the central data center so that data from many aircraft/engines, flights, flight conditions can be processed and/or used to train the machine learning model. As algorithms are trained on more data, the machine learning algorithms monitor health status more accurately and new algorithms and new fault conditions can be considered.

FIG. 10 further schematically illustrates an exemplary parallel processing system or distributed/cloud-based computer system 1000 using a network 1004 to connect one or more client computers 802 to one or more server computers 1006. A typical combination of resources may include a network 1004 comprising the Internet, LANs (local area networks), WANs (wide area networks), SNA (systems network architecture) networks, or the like, client computers 802 that are personal computers or workstations (as set forth in FIG. 8), and server computers 1006 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 1102 and servers 1106 in accordance with embodiments of the invention. Computers 802 and 1006 may comprise nodes that communicate with each other over the network in order to implement the methods described herein.

A network 1004 such as the Internet connects client computers 802 to server computers 1006. Network 1004 may utilize ethernet, coaxial cable, wireless communications, radio frequency (RF), etc. to connect and provide the communication between client computers 802 and server computers 1006. Further, in a cloud-based computing system, resources (e.g., storage, processors, applications, memory, infrastructure, etc.) in client computers 802 and server computers 1006 may be shared by client computers 802, server computers 1006, and users across one or more networks. Resources may be shared by multiple users and can be dynamically reallocated per demand. In this regard, cloud computing may be referred to as a model for enabling access to a shared pool of configurable computing resources particularly useful for artificial intelligence applications or machine learning models that use training data obtained from multiple sources.

Client computers 802 may execute a client application or web browser and communicate with server computers 1006 executing web servers 1010. Such a web browser is typically a program such as MICROSOFT INTERNET EXPLORER/ EDGE, MOZILLA FIREFOX, OPERA, APPLE SAFARI, GOOGLE CHROME, etc. Further, the software executing on client computers 802 may be downloaded from server computer 1006 to client computers 802 and installed as a plug-in or ACTIVEX control of a web browser. Accordingly, client computers 802 may utilize ACTIVEX components/ component object model (COM) or distributed COM (DCOM) components to provide a user interface on a display of client computer 802. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client computer 802 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server computer 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/ or data, when read, executed, and/or interpreted, results in the steps necessary to implement and/or use the present invention being performed. Although the terms "user computer", "client computer", and/or "server computer" are referred to herein, it is understood that such computers 802 and 1006 may be interchangeable and may further include thin client devices with limited or full processing capabilities, portable devices such as cell phones, notebook computers, pocket computers, multi-touch devices, and/or any other devices with suitable processing, communication, and input/output capability. Of course, those skilled in the art will recognize that any combination of the above components, or any number of different components, peripherals, and other devices, may be used with computers 802 and 1006. Embodiments of the invention are implemented as a software application on a client computer 802 or server computer 1006. Further, as described above, the client computer 802 or server computer 1006 may comprise a thin client device or a portable device that has a multi-touch-based display.

In one or more examples, one or more computer services (e.g., utilizing computers 802, 1006) are used to create, store, deploy and use machine learning model(s) 816.

Example: Health Monitoring of Pre-Cooler and Duct Transporting Engine Bleed Air

Figure 11:
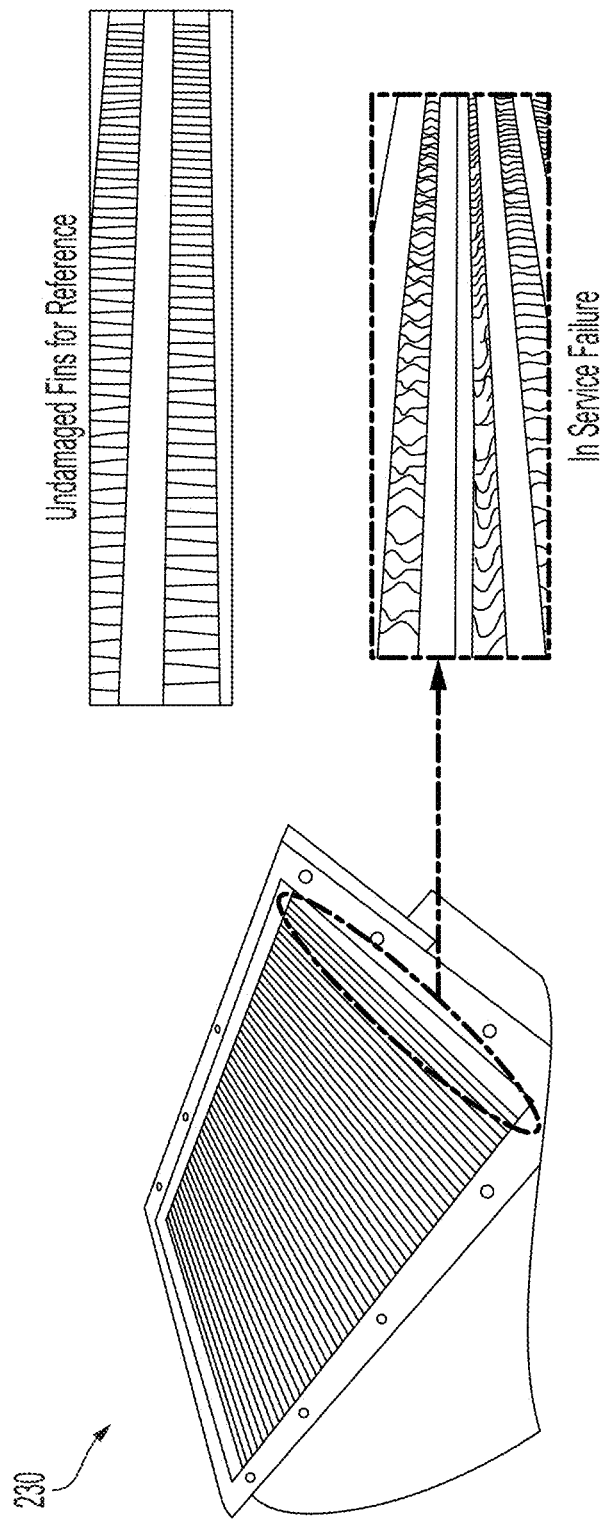
FIG. 11 illustrates a defective air cooler that can be detected using the microphone array disclosed herein.
Figure 12A:
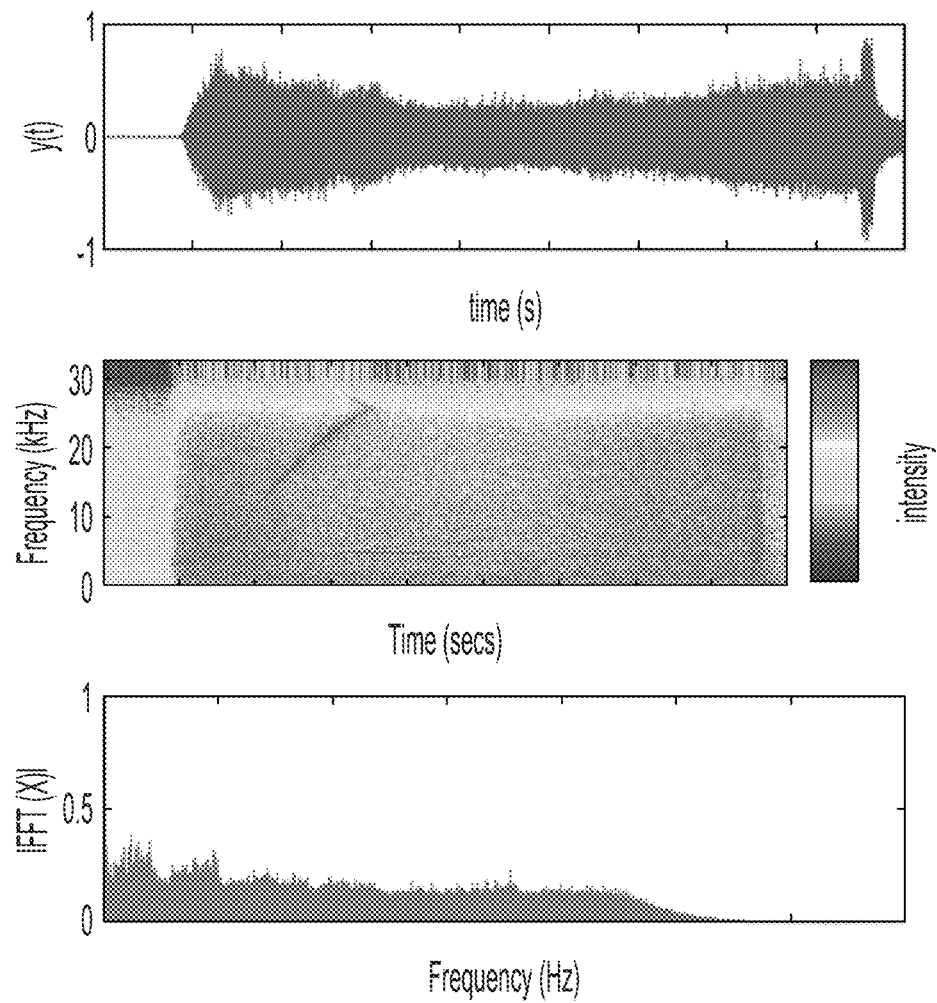
Figure 12B:
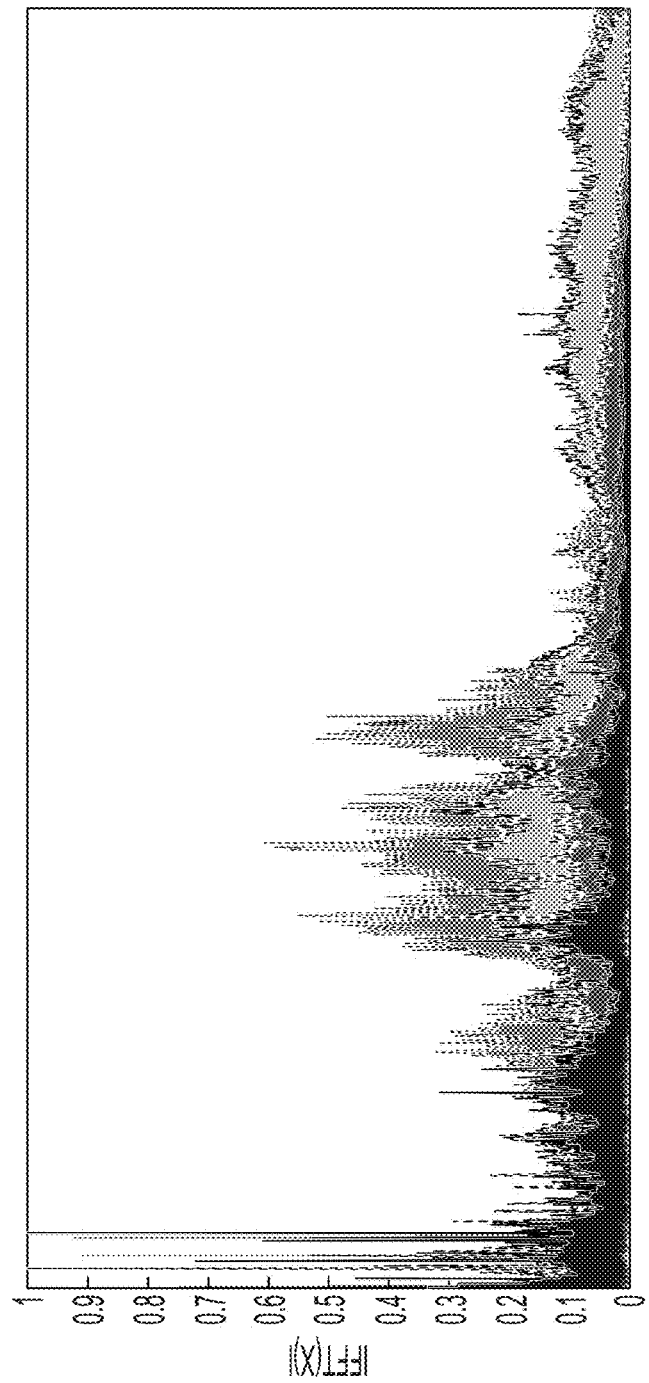
Figure 12C:
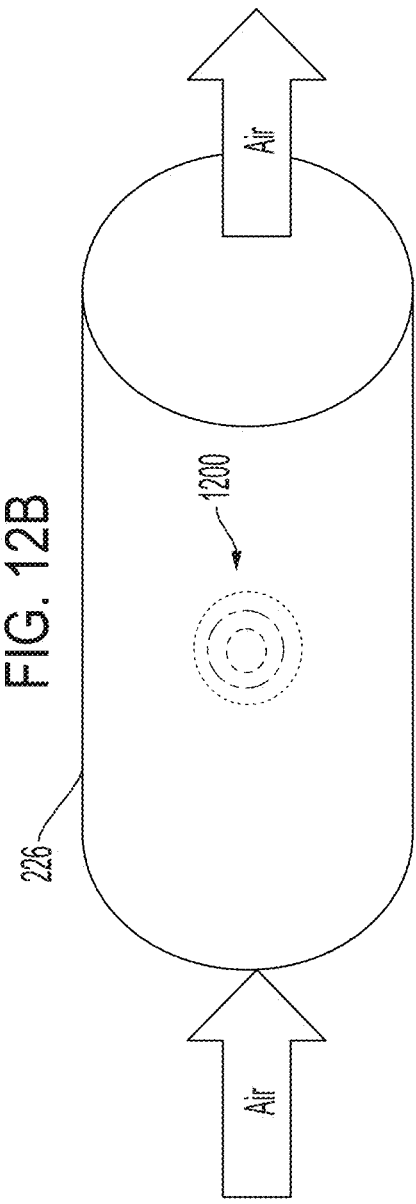

Air-air coolers are used on the aircraft to cool engine bleed air for use on various aircraft systems. The air cooler exchanges heat between hot engine bleed air and cooler air so as to cool the engine bleed air. FIG. 11 illustrates damage to the air cooler 230 can cause air leakages requiring the air cooler to be removed from service for repairs. On conventional aircraft, there is no on-board indication of the leakages that may cause the under cowl to overheat. Moreover, failure occurs on fan air inlet side which can be difficult to access. An acoustic health monitoring system as described herein may detect a damaged pre-cooler (e.g. that generates a whistling sound). FIG. 12A illustrates the acoustic signatures (amplitude y(t), frequency, and Fourier transform FFT(X)) of the acoustic waves transmitted from a damaged air cooler during engine start up and FIG. 12B illustrates the acoustic signature of leaking duct transporting engine bleed air or oil to or inside the air cooler. FIG. 12B illustrates how the frequency of the acoustic waves changes for different sized holes 1200 in the duct 226 illustrated in FIG. 12C.

Example: Monitoring Health of Aeroseal

Figure 13:
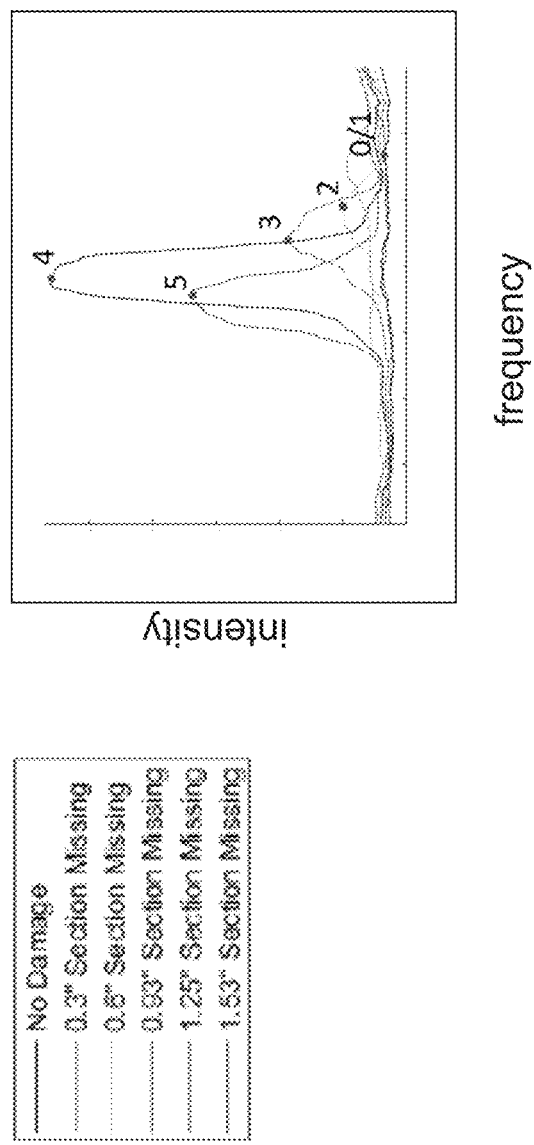
FIG. 13 illustrates the acoustic signature of a leaking aeroseal, e.g., as may be found on an thrust reverser door, wherein the different curves represent the frequency of acoustic waves outputted from the aeroseal for different sized sections missing from the aeroseal.

FIG. 13 illustrates the acoustic signature of a leaking aeroseal, e.g., as may be found on an thrust reverser door.

Figure 14B:
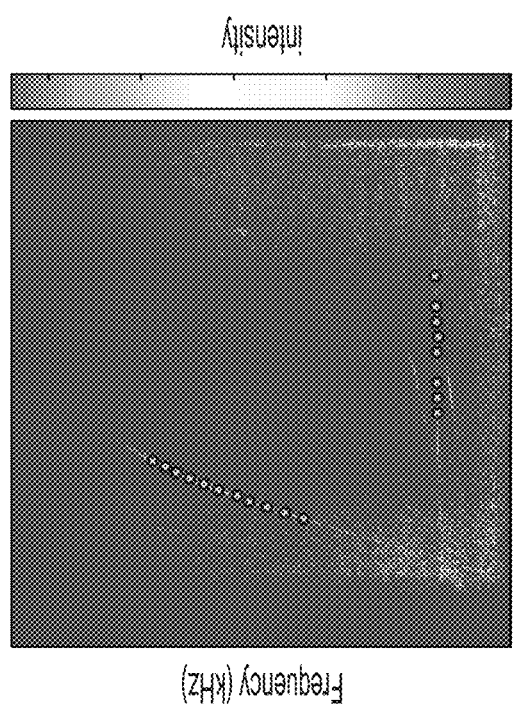
FIG. 14A is a power spectrogram of an aeroseal showing frequency peaks associated with a leak in an aeroseal identified using a MATLAB built in med freq function and FIG. 14B is a power spectrogram of an aeroseal showing frequency peaks associated with a leak in an aeroseal identified using a least cost function.
Figure 14A:
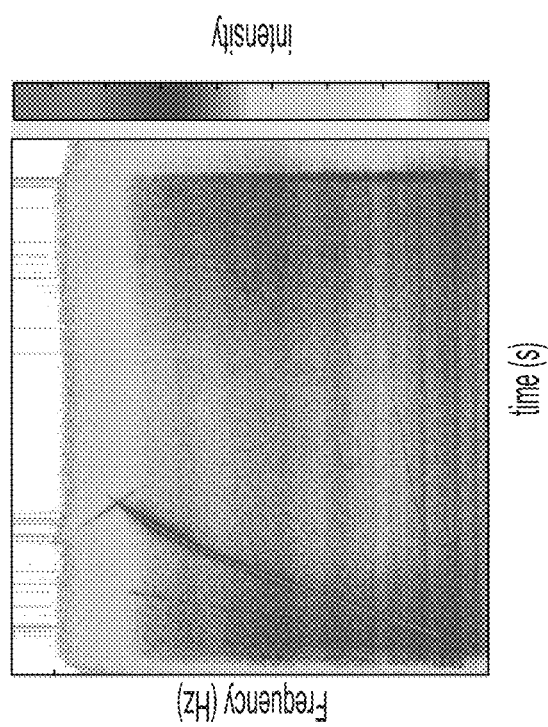

FIG. 14A and FIG. 14B illustrates how certain features, such as the peaks in the Fourier spectrogram, can be used to characterize a sound recording and compare it to others. FIG. 14A illustrates a spectrogram wherein peaks are identified using a MATLAB medfreq function. Other features could be signal statistic parameters, wavelets or Hilbert transform parameters, etc. FIG. 14B illustrates a power spectrogram showing the peaks identified using a least cost function.

Example: Monitoring Health Status of Auxiliary Power Unit

Figure 15:
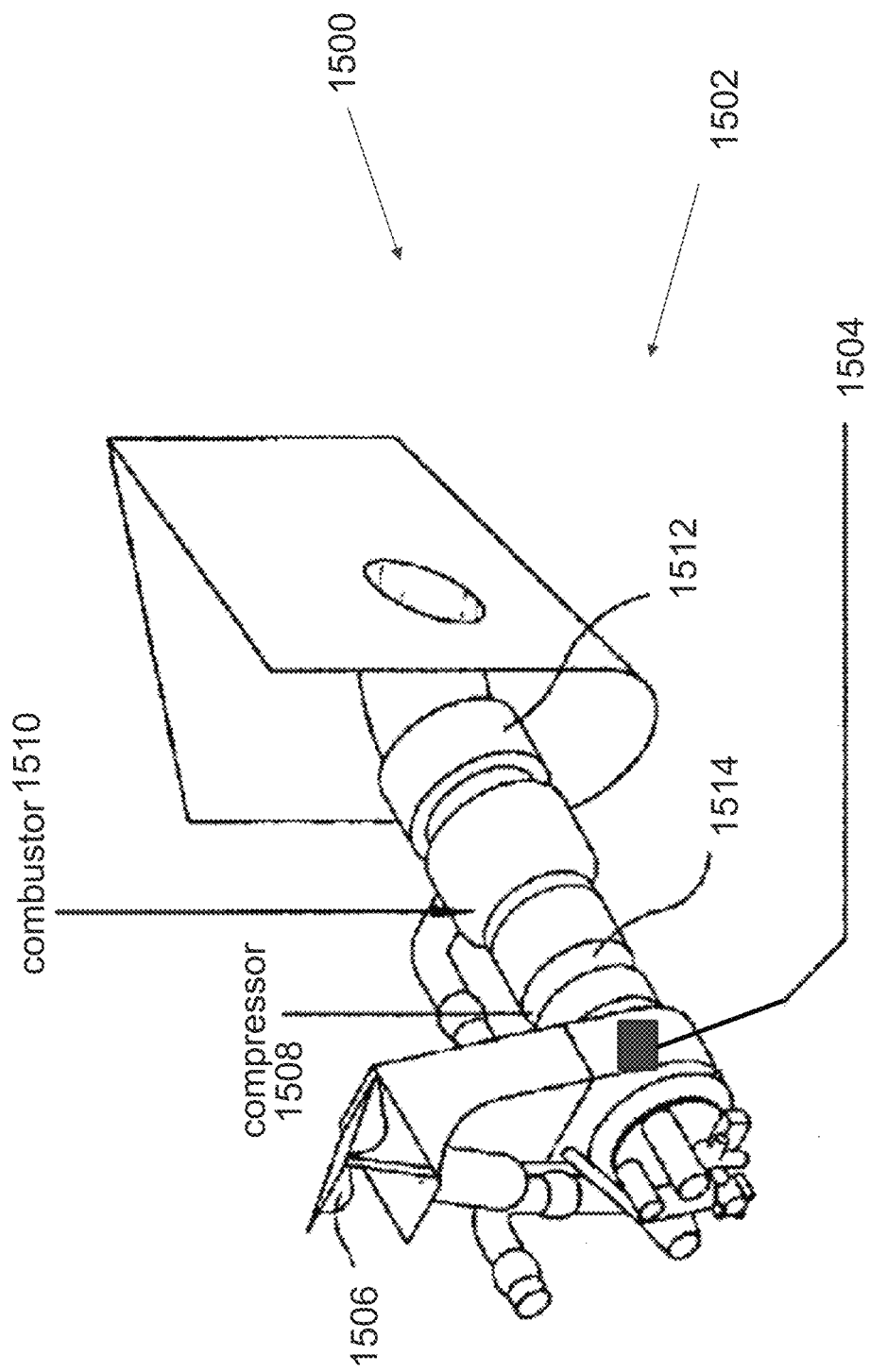
FIG. 15 illustrates positioning of a microphone on an auxiliary power unit, according to one or more examples.

FIG. 15 illustrates an auxiliary power unit (APU) 1500 including turbomachinery 1502 used to generate auxiliary power (e.g., electrical power) and air for the environmental control system while the aircraft is on the ground. The APU is typically installed in the aircraft tail. FIG. 15 illustrates how an array of microphones 1504 may be positioned on the APU comprising an air inlet 1506 (plenum), a compressor 1508 (for providing air to the cabin), a combustor 1510, a turbine 1512, and a housing 1514. In one or more examples, the compressor comprises a two-stage radial compressor.

Further Examples a. Boroscope Plug

A boroscope plug in the compressor may be left out or is loose after engine inspection. A health monitoring system according to examples described herein can extract and detect the acoustic signature (e.g., whistle) caused by the resulting airflow through the gap(s) in the housing during ensuing engine start and/or engine idle, thereby preventing damage due to hot air leaking through the gap.

b. Ignition System

In conventional systems, the electronic engine controller (EEC) cannot determine if the exciter box is actually sparking. There is a ground test for a mechanic to listen for the spark, although this can be difficult to hear in ambient noise. An acoustic health monitoring system according to embodiments described herein can verify sparking of the igniter box without human verification, or at least with a reduced number of mechanics.

Example Embodiments

A health monitoring system according to embodiments described herein can be embodied in many ways including, but not limited to, the following.

1. A system (200), comprising:
one or more acoustic sensors (202) outputting signals in response to acoustic waves (204) transmitted to the one or more acoustic sensors (202) from a plurality of distinct engine subsystems (206) of an engine (208) when the distinct engine subsystems (206) are acoustically coupled to the acoustic sensors (202); wherein the signals (400) comprise information (400d) used to monitors (e.g., in real time) a health status (820) of each of the distinct engine subsystems (206).

2. The system of clause 1, further comprising an output (260) connected to the acoustic sensors (202), wherein the output (260) outputs the health status (820) of each of the distinct engine subsystems (206) when the health status (820) is determined using the signals (400).

3. The system of clause 2, wherein the output (260) comprises an indicator (260a) connected to an electronic circuit (260b).

4. The system of clause 1, further comprising a computer (802) connected to the acoustic sensors (202), wherein the computer (802) monitors the health status (820).

5. The system (200) of clause 4, wherein:
the engine (208) includes a combustor (1510); fan blades (100a), compressor blades (108a), and turbine blades (110a), and
the computer (802) monitors the health status (820) using the signals (400) in combination with data received from the engine (208), the data including at least one parameter selected from a temperature of the engine (208), a speed of the fan blades (100a), a speed of the compressor blades (108a), or a speed of the turbine blades (110a), and a fuel flow to the engine (208).

6. The system (200) of clause 4 or clause 5, wherein:
the computer (802) monitors at least one characteristic of the acoustic waves (204) selected from one or more frequencies (F) of the acoustic waves (204) and one or more amplitudes of the acoustic waves (204), and
changes in the at least one characteristic are used to determine the health status (820).

7. The system (200) of clause 6, wherein the computer (802) performs a Fourier analysis (e.g., Fourier transform FFT(X)) of signal (400) so as to determine the one or more frequencies.

8. The system (200) of any of the clauses 3-9, wherein:
the distinct engine subsystems (206) include components (206a),
the computer (802) or electronic circuit (260b) determines a source of the acoustic waves (204) using a triangulation method, and
the computer (802) or electronic circuit (260b) monitors the health status (820) of at least one of the components (206a) located at the source s(k).

9. The system (200) of any of the clauses 1-8, wherein the distinct engine subsystems (206) include at least one component (206a) selected from a starter motor (210a) clutch, a latch (218) on a door (212, 216) of an engine housing (1514); an air cooler (230) for cooling engine bleed air (228); a duct (226) conveying engine bleed air (228); a compressor (108, 1508), an ignition exciter (224), and a gearbox (132).

10. The system (200) of any of the clauses 1-9, wherein the one or more acoustic sensors (202) are distributed on or around the engine (208) so as to receive the acoustic waves (204) from the distinct engine (208) subsystems (206) in different zones (232) of the engine (208).

11. The system (200) of any of the clauses 4-10, wherein the computer (802) analyzes the signals (400) using a computer implemented machine learning model (816), wherein the computer implemented machine learning model (816) determines the health status (820) of the engine (208) and/or the distinct engine subsystems (206).

12. The system (200) of clause 11, wherein the computer implemented machine learning model (816) comprises a decision tree, a neural network, or a gaussian mixture model.

13. The system (200) of clauses 11 or 12, wherein computer implemented machine learning model (816) is trained with the signals (400) obtained during different operating conditions (e.g., fuel flow to engine, engine speed/fan speed, engine temperature) of the engine (208) and different environmental conditions (e.g., ambient temperature of the engine (208), altitude of the engine (208), aircraft speed), so that the computer implemented machine learning model (816) determines the health status (820) for the different operating conditions.

14. The system (200) of clause 13, wherein the different operating conditions include different engine (208) speeds and different temperatures of the engine (208).

15. The system (200) of any of the clauses 1-14, wherein the engine (208) comprises turbomachinery (1502) on an aircraft (1050).

16. The system (200) of clause 15, wherein the turbomachinery (1502) is in a gas turbine engine (208) propelling the aircraft (1050) or in an auxiliary power unit (1500) on the aircraft (1050).

17. A system (200), comprising:
one or more acoustic sensors (202) outputting signals (400) in response to acoustic waves (204) transmitted from one or more engine (208) components (206a);
a computer (802) connected to the acoustic sensors (202), wherein:
the computer (802) analyzes the signals (400) using a computer implemented machine learning model (816), and
the computer implemented machine learning model (816) determines a health status (820) of the engine (208) components (206a) acoustically coupled to the one or more acoustic sensors (202).

18. A computer-implemented method, comprising:
monitoring health of an engine (208) or engine subsystem (206a), including:
receiving signals (400) in response to acoustic waves (204) transmitted from the engine (208) or the engine subsystem (206a);
providing a computer-implemented machine learning model (816);
analyzing the signals (400) using the computer-implemented machine learning model (816) so as to determine a health status (820) of the engine (208) or the engine subsystem (206).

19. The method of clause 18, further comprising:
training the computer-implemented machine learning model (816) using the signals (400) comprising training signals (400a), including:
obtaining the training signals (400a) during different operating conditions of the engine (208) or the engine subsystem (206a);
obtaining at least one property of the training signals (400a) as a function of the different operating conditions, the at least one property selected from one or more frequencies of the acoustic waves (204) and one or more amplitudes of the acoustic waves (204):
the one or more frequencies including one or more first frequencies and one or more second frequencies, and
the one or more amplitudes including one or more first amplitudes and one or more second amplitudes;

determining a plurality of health statuses (820) of the engine (208) or the engine subsystem (206) as a function of the different operating conditions, the health statuses (820) including:
a first health status (820a) associated with the engine (208) comprising a healthy engine (208a) or an engine subsystem (206) comprising healthy engine subsystem (206a), and
a second health status (820b) associated with the engine (208) comprising an unhealthy engine (208b) or the engine subsystem (206) comprising an unhealthy engine subsystem (206a),
associating the one or more first frequencies, the one or more first amplitudes, or the one or more first frequencies and the one or more first amplitudes, with the first health status (820a); and
associating the one or more second frequencies, the one or more second amplitudes, or the one or more second frequencies and the one or more second amplitudes, with the second health status (820b);
so as to obtain the computer-implemented machine learning model (816) comprising a trained computer-implemented machine learning model (816b); and
analyzing the signals (400) comprising non-training signals (400b) different from the training signals (400a) using the trained computer-implemented machine learning model (816b), so as to determine the health status (820) of the engine (208) or the engine subsystem (206) transmitting the non-training signals (400b).

20. The method of clause 18 or 19, wherein the analyzing comprises comparing the training signals (400a) and the non-training signals (400b), wherein the health status (820) is healthy if the one or more frequencies and/or the one or more amplitudes of the training signals (400a) are in a range encompassing the first frequencies and/or the first amplitudes.

21. The method of any of the clauses 18-20, wherein the engine (208) or the engine subsystem (206) comprises a component (206a), the method further comprising:
performing a Fourier analysis of the signal so as to determine the one or more frequencies; and
determining a source of the acoustic waves (204) using triangulation, wherein the computer (802)-implemented machine learning model monitors the health status (820) of the component located at the source.

22. The method of any of the clauses 18-21, wherein the acoustic waves (204) are transmitted from at least one component (206a) of the engine (208) or the engine subsystem (206) selected from a starter motor (210a) clutch, an aeroseal (220), a duct (226) for transporting engine (208) bleed air (228); an air cooler (230); a latch (218) on a door of an engine housing; an engine compressor (108), an ignition exciter (224), and a gearbox (134).

23. The method of any of the clauses 18-22, wherein the analyzing comprises comparing the training signals 400a and the signals 400 different from the training signals.

24. An Acoustic Health Monitoring (AHM) system 200 comprising an array of microphone sensors (202) to detect any event in an aircraft engine; a data collection system; and an analytical software, which is used to monitor the engine's health status.

25. The system 200 of any of the clauses 1-24, further including sensors for detecting an event in any single parameter of the engine's performance (e.g. fan speed, EGT, or oil/fuel/scavenge pressure).

26. The system 200 of clauses 25 or 26, wherein each event detected is analyzed and processed and consolidated to report out to the maintenance crew in a more controlled and specific manner.

27. The system 200 of any of the clauses 1-26 wherein the acoustic sensor (e.g., microphones) are zonal sensors in any distinct subsystems of the engine or nacelle.

28. The system 200 of any of the clauses 1-27 combined with a conventional engine health monitoring system so as provide an augmented engine health monitoring system.

29. The system 200 of any of the clauses 1-28, wherein the sensors detect anomalies in 3D designs of the engine.

30. The system 200 of any of the clauses 1-29, wherein the signals 400 are analyzed using mathematical tools (frequency, spectral, spatial, source identification).

31. The system 200 of any of the clauses 1-30, wherein simulation (e.g., using machine learning) is used to recreate engine failure sounds and the computer determines the health by comparing the signals 400 with the simulated engine failure sounds.

32. The system 200 of any of the clause 31, wherein an engine start sound library is populated and used to and calibrate the simulation using supervised learning.

33. The system 200 of any of the clauses 1-32, wherein the computer determines the health of the engine subsystem using the signals 400 and taking into account sensitivity of features of the signals 400 to environmental factors and statistical variance.

Advantages and Improvements

An objective of acoustical health monitoring according to embodiments described herein is the incorporation of "zonal" sensors, where anomalies of several distinct subsystems of an engine can be detected by analyzing data from one sensor or one array of sensors. This is opposed to more fault detection, wherein a single sensor detects a single parameter (e.g., fan speed, exhaust temperature, or oil pressure).

Accelerometers also provide zonal sensing capability, however, the frequency signature of a fault condition must be able to communicate structurally to the structure where the accelerometer is installed For example, low-pressure and high-pressure rotors each have many different modes associated with different failure/degradation states and each rotor must be instrumented independently using conventional methods. In addition, conventional methods require independent instrumentation for adequate information gathering of the health status of the accessory gearbox.

In conventional health monitoring systems, mathematical analysis methods of acoustical and vibrational data are very similar, e.g., frequency based. Microphone-based data according to embodiments described herein enables the analysis methods to be freed of this constraint.

In addition to frequency analysis, the data from a microphone array can be combined with "full flight data" including data from the electronic engine control (EEC), for example, fan speed, cooling valve position, engine operating mode, or engine start progress.

An incomplete list of faults that the team hope to detect include leaking aero seals in the nacelle, other gaps or holes in the nacelle, engine igniter failure, starter motor clutch failure, fuel nozzle leaks/failure, and anomalies in the combustor chamber. Generally, methods created to detect faults on an engine will apply to both the aircraft main engines and the APU.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A system, comprising:
a plurality of acoustic sensors outputting signals in response to acoustic waves transmitted to the acoustic sensors from a plurality of distinct engine subsystems of an engine when the distinct engine subsystems are acoustically coupled to the acoustic sensors; and
wherein the signals comprise information used to monitor a health status of each of the distinct engine subsystems,
the engine comprises a gas turbine engine for propelling an aircraft or an auxiliary power unit for the aircraft;
the distinct engine subsystems comprise components;
the acoustic sensors are distributed on or around the engine so as to receive the acoustic waves from the distinct engine subsystems in different zones of the engine, so that one or more sources of the acoustic waves in the distinct engine subsystems can be determined; and
a computer connected to the acoustic sensors, wherein the computer:
localizes one of the sources of the acoustic waves using a sound source localization method;
monitors at least one characteristic of the acoustic waves selected from one or more frequencies of the acoustic waves and one or more amplitudes of the acoustic waves from the one of the sources localized using the sound source localization method, and
uses a change in the at least one characteristic to determine the health status of at least one of the components located at the one of the sources.

2. The system of claim 1, further comprising an output connected to the acoustic sensors, wherein the output outputs the health status of each of the distinct engine subsystems determined using the signals.

3. The system of claim 2, wherein the output comprises an indicator connected to an electronic circuit.

4. The system of claim 1, further comprising the computer connected to the acoustic sensors, wherein the sound source localization method extracts the one of the sources from at least one of undesired noise, interference, echoing, or reverberation by analyzing the acoustic waves in time and frequency.

5. The system of claim 1, wherein:
the engine includes a combustor; fan blades, compressor blades, and turbine blades, and
the computer monitors the health status using the signals in combination with data received from the engine, the data including at least one parameter selected from a temperature of the engine, a speed of the fan blades, a speed of the compressor blades, or a speed of the turbine blades, and a fuel flow to the engine.

6. The system of claim 1, wherein:
the computer monitors at least one characteristic of the acoustic waves selected from one or more frequencies of the acoustic waves and one or more amplitudes of the acoustic waves, and
changes in the at least one characteristic are used to determine the health status.

7. The system of claim 6, wherein the computer performs a Fourier analysis of the signals so as to determine the one or more frequencies.

8. The system of claim 1, wherein:
the sound source localization method comprises a triangulation method using time of arrival of the acoustic waves.

9. The system of claim 1, wherein the computer is on board the aircraft and analyzes the signals using a computer implemented machine learning model, wherein the computer implemented machine learning model determines the health status of the distinct engine subsystems.

10. The system of claim 9, wherein the computer implemented machine learning model comprises a decision tree, a neural network, or a gaussian mixture model.

11. The system of claim 9, wherein computer implemented machine learning model is trained with the signals obtained during different operating conditions of the engine and/or different environmental conditions of the engine, so that the computer implemented machine learning model determines the health status for the different operating conditions.

12. The system of claim 11, wherein the different operating conditions include different engine speeds and different temperatures of the engine.

13. The system of claim 1, wherein the engine comprises turbomachinery.

14. The system of claim 1, wherein the acoustic sensors are positioned to detect the acoustic waves propagating through free space between the engine subsystems and the sensors.

15. The system of claim 1, wherein the distinct engine subsystems include at least one component selected from a starter motor clutch, a latch on a door of an engine housing; an air cooler for cooling engine bleed air; a duct conveying engine bleed air; a compressor, an ignition exciter, and a gearbox and wherein the acoustic waves are used to detect at least one of a nacelle aero seal leak, a starter motor clutch failing to engage or disengage, a fan cowl latch failure, an unlocked fan cowl latch, electrical generator bearing deterioration, a hydraulic pump bearing degradation; an open boroscope plug, or a faulty ignition exciter as identified by a failure of the ignition exciter to output a clicking sound upon ignition.

16. The system of claim 1, wherein:
the computer is on board the aircraft; and
the aircraft engine comprises a fan comprising fan blades; a compressor comprising compressor blades; a turbine comprising turbine blades; a combustor receiving a fuel flow; an exhaust for outputting an exhaust gas; and oil, wherein the computer monitors the health status under operating conditions including speed of the fan blades, speed of the compressor blades, speed of the turbine blades, temperature of the exhaust gas, outlet pressure of the compressor, the fuel flow, a pressure of the oil, a temperature of the oil, an altitude of the aircraft, a speed of the aircraft, and an air temperature.

17. A method of making a system, comprising:
positioning a plurality of acoustic sensors outputting signals in response to acoustic waves transmitted to the acoustic sensors from a plurality of distinct engine subsystems of an engine when the distinct engine subsystems are acoustically coupled to the acoustic sensors; and
wherein the signals comprise information used to monitor a health status of each of the distinct engine subsystems,
the engine comprises a gas turbine engine for propelling an aircraft or an auxiliary power unit for the aircraft;
the distinct engine subsystems comprise components;
the acoustic sensors are distributed on or around the engine so as to receive the acoustic waves from the distinct engine subsystems in different zones of the engine, so that one or more sources of the acoustic waves in the distinct engine subsystems can be determined; and
connecting a computer to the acoustic sensors, wherein the computer:
localizes one of the sources of the acoustic waves using a sound source localization method;
monitors at least one characteristic of the acoustic waves selected from one or more frequencies of the acoustic waves and one or more amplitudes of the acoustic waves from the one of the sources localized using the sound source localization method, and
uses a change in the at least one characteristic to determine the health status of at least one of the components located at the one of the sources.

18. The method of claim 17 wherein:
the computer is trained to analyze the signals using a computer-implemented machine learning model so as to determine the health status of the engine or the each of the distinct engine subsystems, wherein the computer implemented machine learning model is trained with the signals obtained during different operating conditions of the engine so that the computer implemented machine learning model determines the health status for the different operating conditions.

19. The method of claim 18, further comprising:
training the computer-implemented machine learning model using the signals comprising training signals, including:
obtaining the training signals during different operating conditions of the engine or the distinct engine subsystems;
obtaining at least one property of the training signals as a function of the different operating conditions, the at least one property selected from one or more frequencies of the acoustic waves and one or more amplitudes of the acoustic waves:
the one or more frequencies including one or more first frequencies and one or more second frequencies, and
the one or more amplitudes including one or more first amplitudes and one or more second amplitudes;
wherein the computer is programmable to:
determine a plurality of health statuses of the engine or the distinct engine subsystems as a function of the different operating conditions, the plurality of health statuses including:
a first health status associated with the engine comprising a healthy engine or the each of the distinct engine subsystems comprising a healthy engine subsystem, and
a second health status associated with the engine comprising an unhealthy engine or the each of the distinct engine subsystems comprising an unhealthy engine subsystem,
associating the one or more first frequencies, the one or more first amplitudes, or the one or more first frequencies and the one or more first amplitudes, with the first health status; and
associating the one or more second frequencies, the one or more second amplitudes, or the one or more second frequencies and the one or more second amplitudes, with the second health status;

so as to obtain the computer-implemented machine learning model comprising a trained computer-implemented machine learning model; and analyzing the signals comprising non-training signals different from the training signals using the trained computer-implemented machine learning model, so as to determine the health status of the engine or the each of the distinct engine subsystems transmitting the non-training signals.

20. The method of claim 19, wherein the analyzing comprises comparing the training signals and the non-training signals, wherein the health status is healthy if the one or more frequencies and/or the one or more amplitudes of the training signals are in a range encompassing the first frequencies and/or the first amplitudes.

21. The method of claim 18, wherein the engine or the each of the distinct engine subsystems comprises a component, the method further comprising:

performing a Fourier analysis of the signals so as to determine the one or more frequencies; and determining a source of the acoustic waves using triangulation, wherein the computer-implemented machine learning model monitors the health status of the component located at the source.

22. The method of claim 18, wherein the acoustic waves are transmitted from at least one component of the engine or the distinct engine subsystems selected from a starter motor clutch, an aeroseal, a duct for transporting engine bleed air; an air cooler; a latch on a door of an engine housing; an engine compressor, an ignition exciter, and a gearbox.

* * * * *